United States Patent
Levander et al.

(10) Patent No.: US 8,960,113 B2
(45) Date of Patent: Feb. 24, 2015

(54) MARINE VESSEL (75) Inventors: Oskar Levander, Lansiturunmaa (FI); Mathias Jansson, Vaasa (FI)

(73) Assignee: Wartsila Finland Oy, Vaasa (FI)

( * ) Notice: Subject to any disclaimer, the term of this patent is extended or adjusted under 35 U.S.C. 154(b) by 282 days.

(21) Appl. No.: 13/257,095

(22) PCT Filed: Feb. 17, 2010

(86) PCT No.: PCT/FI2010/050104
§ 371 (c)(1), (2), (4) Date: Sep. 16, 2011

(87) PCT Pub. No.: WO2010/116024
PCT Pub. Date: Oct. 14, 2010

(65) Prior Publication Data
US 2012/0000408 A1    Jan. 5, 2012

(30) Foreign Application Priority Data
Apr. 9, 2009  (FI) ...................................... 20095396

(51) Int. Cl.
*B63B 35/00* (2006.01)
*B63H 9/02* (2006.01)

(52) U.S. Cl.
CPC .. *B63H 9/02* (2013.01); *Y02T 70/58* (2013.01)
USPC ...................................................... 114/39.3

(58) Field of Classification Search
USPC .................. 114/39.21, 39.3–39.32; 440/8
See application file for complete search history.

(56) References Cited

U.S. PATENT DOCUMENTS

| | | | |
|---|---|---|---|
| 1,341,045 A | | 5/1920 | Currey |
| 3,942,909 A | | 3/1976 | Yengst |
| 4,401,284 A | * | 8/1983 | Austin ............................ 244/21 |
| 4,582,013 A | * | 4/1986 | Holland, Jr. .................. 114/39.3 |
| 4,602,584 A | * | 7/1986 | North et al. .................. 114/39.3 |
| 8,261,681 B2 | * | 1/2012 | Levander et al. ............ 114/39.3 |

FOREIGN PATENT DOCUMENTS

| | | |
|---|---|---|
| AT | 501 924 A1 | 12/2006 |
| DE | 31 17 875 A1 | 11/1982 |
| DE | 20 2007 009 279 U1 | 2/2008 |

(Continued)

OTHER PUBLICATIONS

European Office Action for European Application No. 10 706 691.2 dated Dec. 3, 2012.

(Continued)

*Primary Examiner* — Daniel V Venne
(74) *Attorney, Agent, or Firm* — Muncy, Geissler, Olds & Lowe, P.C.

(57) ABSTRACT

The invention relates to a marine vessel comprising a hull and a propulsion arrangement. The marine vessel is further provided with at least one vertically arranged cylinder (6) with a cylindrical shell and with a first vertical axis (7). The vertically arranged cylinder is adapted to rotate around the first vertical axis. In order to provide a flexibly adaptable arrangement suitable for various operating modes of the marine vessel, the cylindrical shell comprises at least three sections (62, 63, 64) with a curved portion extending between two ends, whereby each of the three sections is arranged to be turnable around a respective second vertical axis (8), which is positioned at the circumference of the cylindrical shell. Each section is arranged to be anchored into a given position.

9 Claims, 6 Drawing Sheets

(56) References Cited

FOREIGN PATENT DOCUMENTS

| | | |
|---|---|---|
| DE | 20 2007 009279 U1 | 2/2008 |
| FR | 2 472 678 A1 | 7/1981 |
| JP | 71138 | 11/1926 |
| JP | S 57-55292 A | 4/1982 |
| JP | H 04-287792 A | 10/1992 |
| SU | 1512856 | 10/1989 |

OTHER PUBLICATIONS

Japanese Office Action for Japanese Application No. 2012-504037 dated Feb. 20, 2014 English Translation.

* cited by examiner

MARINE VESSEL

TECHNICAL FIELD

The present invention relates to a marine vessel comprising a hull and a propulsion arrangement including an internal combustion engine and a propulsion unit, which marine vessel further is provided with at least one vertically arranged cylinder with a cylindrical shell and with a first vertical axis, which vertically arranged cylinder is adapted to rotate around the first vertical axis according to the preamble of claim 1.

BACKGROUND ART

Marine vessels provided with vertically arranged revolving cylinders are previously known. A cylinder revolving in the wind will exert pressure at right angles to the wind current. This principle is known as the Magnus law or Magnus effect. Such a cylinder, or rotor, when it is spinning in the wind, generates a low pressure and a high pressure on opposite sides of the cylinder.

As the wind hits a revolving/rotating cylinder from the side, one side of the cylindrical surface naturally goes against the wind, and the other side goes with the wind. There is very little friction on the side that goes with the wind, and much friction on the side that goes against the wind.

On the side that goes against the wind, the velocity of the wind is opposed by the velocity of air adjoining the cylinder, thus retarding the velocity of the wind. This means an increase in pressure. On the other side of the cylinder, the velocity of the wind combines with the velocity of the air layers next to the cylinder, resulting in a decrease of pressure. This leads to a strong force from the increased pressure side to the decreased pressure side, which generates forward thrust in side winds to move the marine vessel.

The above represents a Magnus effect propulsion system, or named after its inventor Dr Anton Flettner, a Flettner rotor.

Such a Flettner rotor does not generate any benefit in head and tail winds. The Flettner rotor generates extra wind resistance as it increases the cross section area of the ship in the wind in sea going operation. Further, the Flettner rotor does not bring any benefit in port.

In DE 20 2007 009 279 U1 discloses a modified version of the Flettner rotor, whereby a Flettner rotor is turned into a so-called Savonius rotor with two semi-circle parts forming a wind turbine that may rotate a generator. This expands the use of a conventional Flettner rotor, however, only in a limited way.

SUMMARY OF INVENTION

An object of the invention is to avoid the disadvantages of prior art and to achieve a marine vessel with a vertically arranged cylinder, i.e. a Flettner rotor, that can provide variable functions depending on prevailing operating conditions. This object is attained by a marine vessel according to claim 1.

The basic idea of the invention is to configure the vertically arranged cylinder, i.e. the Flettner rotor, so that it provides a flexibly adaptable arrangement suitable for deployment in various operating modes of the marine vessel. The cylindrical shell of the vertically arranged cylinder comprises at least three sections with a curved portion extending between two opposite ends, whereby each of the three sections is arranged to be turnable around a respective second vertical axis. Each second vertical axis is positioned at the circumference of the cylindrical shell. Each section is arranged to be anchored into a given position. This allows for positioning the sections in various configurations suitable for a prevailing operation mode of the marine vessel.

Preferably the ends of each section are arranged to be anchored against each other to form the cylindrical shell of the vertically arranged cylinder. In this configuration the sections form a so-called Flettner rotor.

In order to form a wind turbine, it is advantageous that each section provided with the respective second vertical axis is arranged to be anchored to the first vertical axis of the vertically arranged cylinder by means of one of its ends.

In order to form a sail structure it is advantageous that two sections of said three sections are arranged to be anchored to each other by means of one end of each section.

In this case it is preferably that the one section, other than the two sections mentioned above, of said three sections is arranged to be anchored in its position at the circumference of the cylindrical shell, whereby this one section also contributes to the sail structure.

In connection with the above discussed embodiments it is advantageous that the second vertical axis of each section is positioned substantially in the middle of the curved portion of each section.

Further, the vertically arranged cylinder advantageously comprises an internal cylindrical sleeve. By means of the internal cylindrical sleeve, an additional function can be added to the vertically arranged cylinder. The internal cylindrical sleeve can function as an exhaust pipe within the vertically arranged cylinder, whereby the various configurations discussed above can be maintained as well. This avoids having the exhaust pipe as a separate structure on the marine vessel.

Advantageously in this case, in order to provide a wind turbine, each section provided with the second vertical axis is arranged to be anchored at the internal cylindrical sleeve by means of one of its ends. This enlarges the cross-area of the wind turbine configuration thus providing a higher output.

In this case it is advantageous that the second vertical axis of each section is positioned offset from the middle of the curved portion of each section.

The vertically arranged cylinder is advantageously operatively connected to an electric motor, a combined generator and electric motor, and/or a generator. This provides for using the vertically arranged cylinder in its different configurations as desired, for generating additional thrust or power for the marine vessel.

The advantageous features of the marine vessel according to the present invention are given in the claims.

BRIEF DESCRIPTION OF DRAWINGS

In the following the invention will be described, by way of example only, with reference to the accompanying schematic drawings, in which.

DETAILED DESCRIPTION

Figure 1:
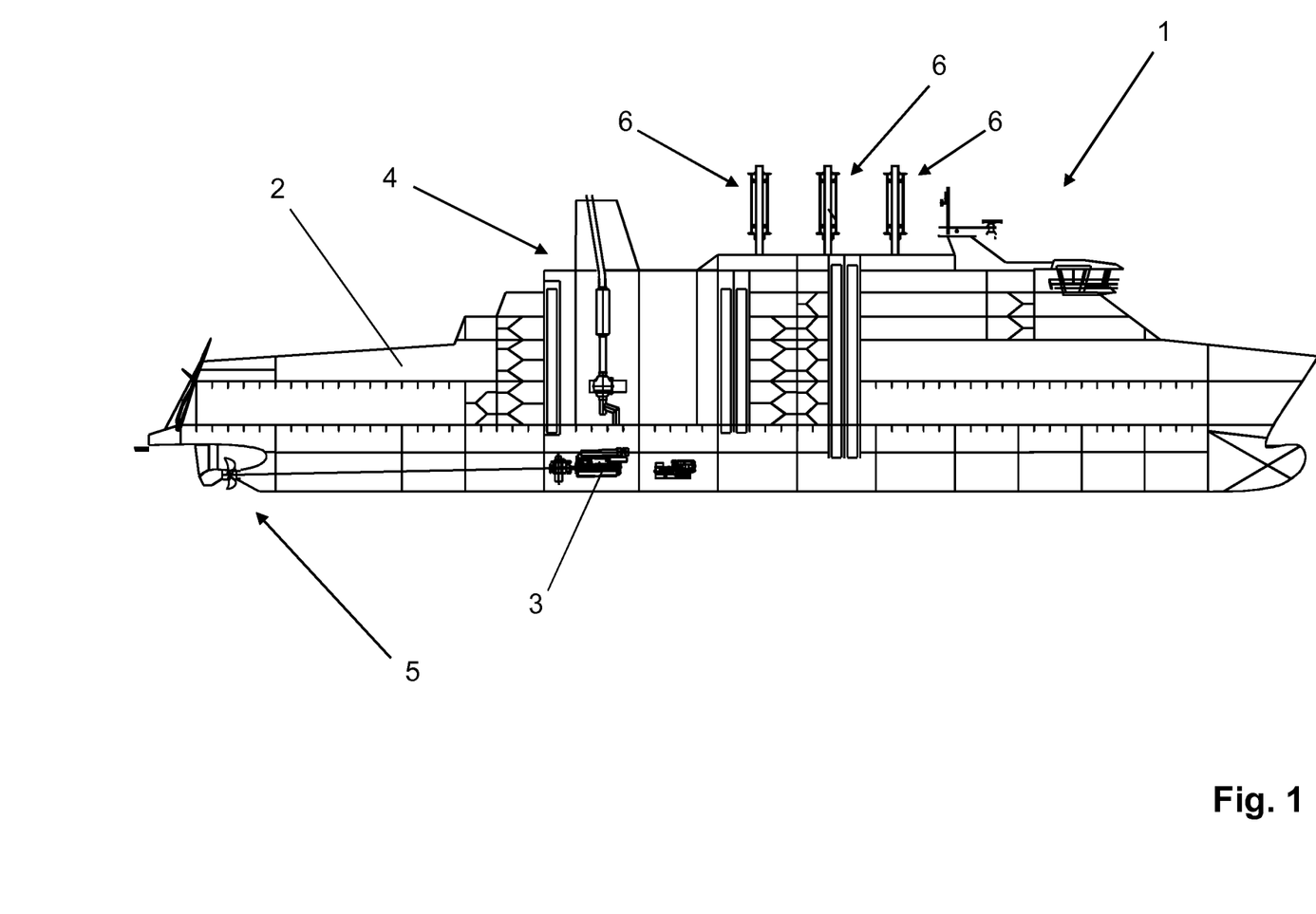
FIG. 1 illustrates a marine vessel provided with a vertically arranged cylinder.

FIG. 1 shows a marine vessel 1 comprising a hull 2 and propulsion arrangement including an internal combustion engine 3, an exhaust gas arrangement 4, including an exhaust gas pipe with a funnel means, and a propulsion unit 5. Further, the marine vessel comprises three vertically arranged cylinders 6, each of which is arranged to be rotated around a first vertical axis 7 (FIG. 2).

Figure 2:
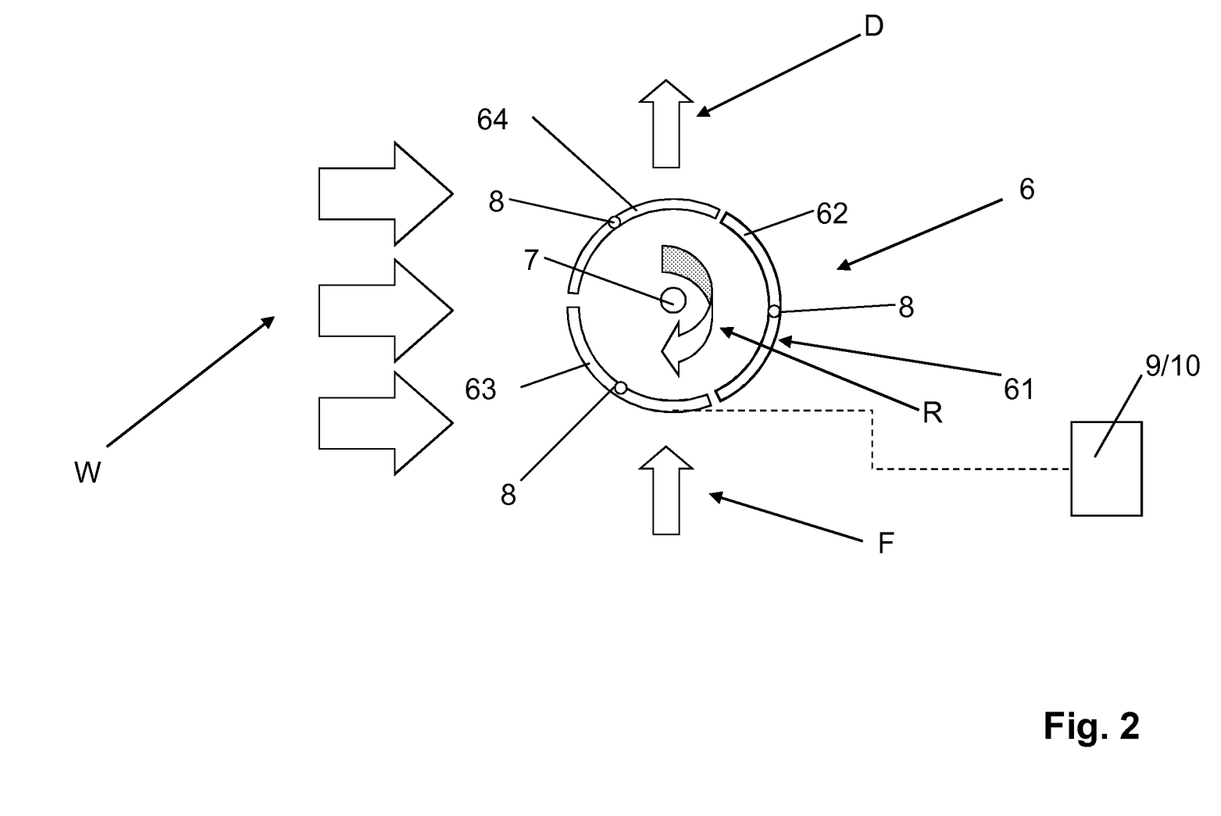
FIG. 2 illustrates a first embodiment of the present invention in a first mode of deployment.

FIG. 2 illustrates a first embodiment of the present invention in a first mode of deployment. The vertically arranged cylinder is indicated by reference sign 6 and the first vertical axis by reference sign 7. The vertically arranged cylinder 6 comprises a cylindrical shell 61 with three sections, a first section 62, a second section 63 and a third section 64. Each section forms a part, more specifically a curved portion, including two opposite ends, of the cylindrical shell 61. Further, each section is provided with a second vertical axis 8 around which the sections are turnable into a given position.

The three parallel arrows show the wind indicated by reference sign W, the curved arrow R indicates the direction of rotation of the vertically arranged cylinder 6 around the first vertical axis 7, reference sign F indicates the force, or forward thrust, generated by the Magnus effect discussed above, and reference sign D indicates the resulting direction of movement of the marine vessel (not shown).

The side wind W engages the vertically arranged cylinder 6, with the three sections (first section 62, second section 63 and third section 64) forming the cylindrical shell 61, which is rotated around the first vertical axis 7 by means of a schematically indicated combined electric motor and generator 10 in direction R, whereby the Magnus effect generates an increased pressure on one side and a decreased pressure, or suction, at the opposite side of the vertically arranged cylinder 6. This results in a force F, or forward thrust, which moves the marine vessel forward in direction D.

The above described function applies to the marine vessel in seagoing operation. The rotation of the vertically arranged cylinder 6 may of course be in an opposite direction, thus in a corresponding manner providing thrust in a corresponding opposite direction.

Figure 3:
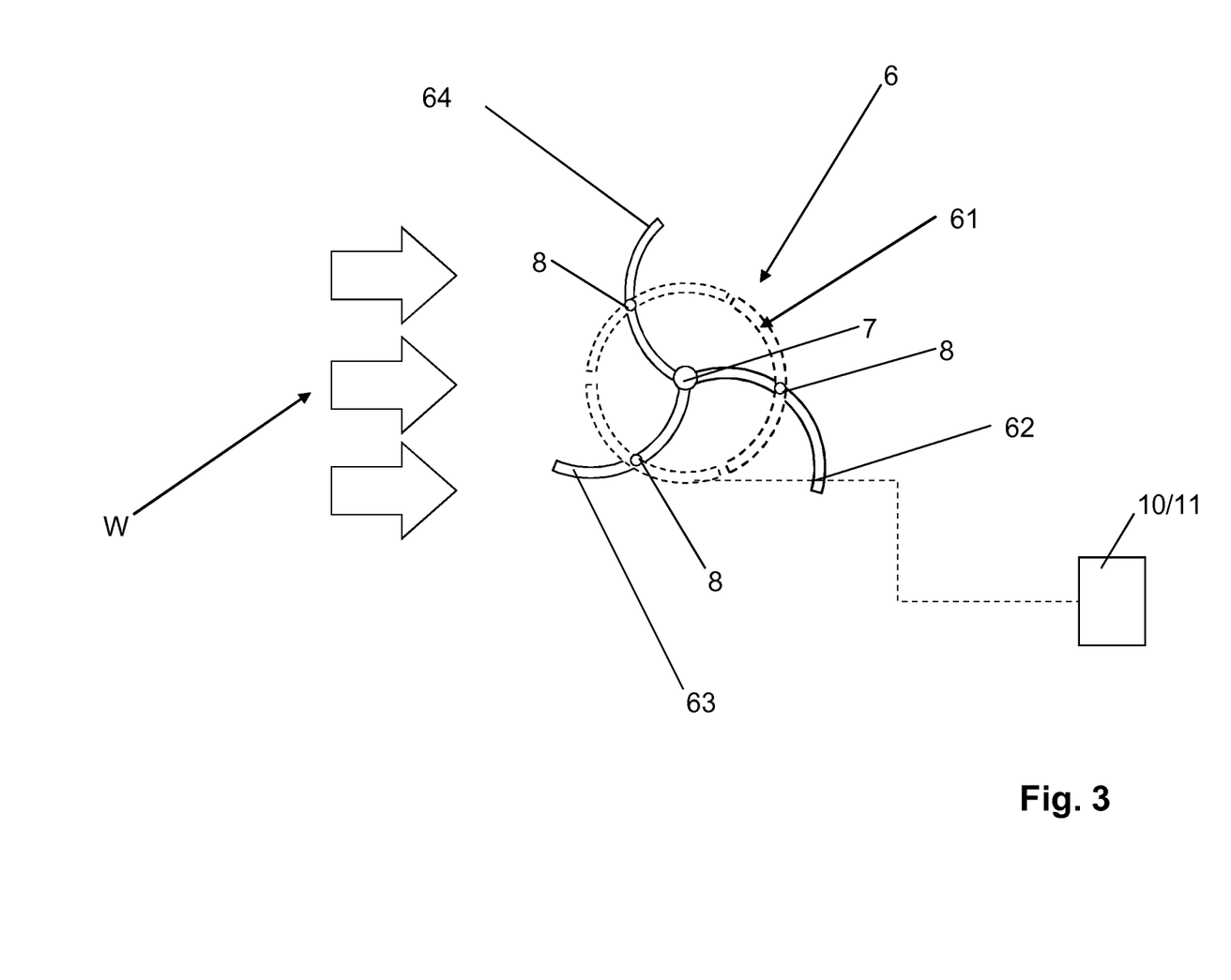
FIG. 3 illustrates the first embodiment in a second mode of deployment.

FIG. 3 illustrates the first embodiment of the present invention in a second mode of deployment. The vertically arranged cylinder is indicated by reference sign 6 and the first vertical axis by reference sign 7. The vertically arranged cylinder 6 comprises three sections, a first section 62, a second section 63 and a third section 64, each arranged to be turned around a second vertical axis 8 positioned substantially at the middle of the curved portion of each section. The three parallel arrows show the wind indicated by reference sign W. Each section, i.e. the first section 62, the second section 63, and the third section 63, provided with a respective second vertical axis 8, is anchored to the first vertical axis 7 by means of one of its ends in order to provide a three-scoop wind turbine.

In this way the three-scoop wind turbine is open to catch the wind W and can thus be deployed for rotation. The wind turbine can be used to generate electric power when the marine vessel 1 (FIG. 1) is e.g. in port. The wind turbine is advantageously connected to a combined electric motor and generator 10, which thus can be used both for generating power in this mode of deployment as well as for rotating the vertically arranged cylinder in its first mode of deployment (FIG. 2), in which the three sections form a cylindrical shell 61, now indicated by broken lines.

Clearly a separate electric motor 9 and a separate generator 11 can be used in the first and second modes of deployment respectively of the first embodiment.

This provides electric power production in an environmentally friendly way, particularly in port or other stationary conditions of the marine vessel. Clearly, this is an efficient means for saving energy.

Figure 4:
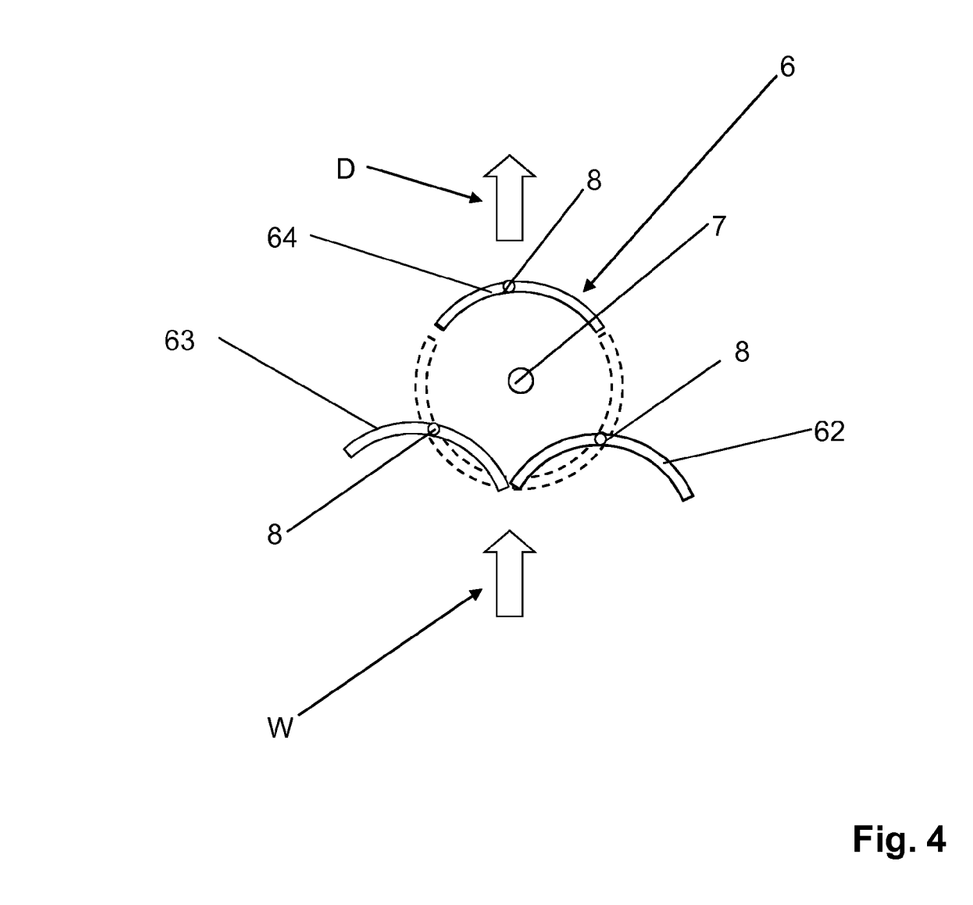
FIG. 4 illustrates the first embodiment in a third mode of deployment.

FIG. 4 illustrates the first embodiment of the present invention in a third mode of deployment. The vertically arranged cylinder is indicated by reference sign 6 and the first vertical axis by reference sign 7. The vertically arranged cylinder 6 comprises three sections, a first section 62, a second section 63 and a third section 64, each arranged to be turned around a second vertical axis 8 positioned substantially at the middle of the curved portion of each section. The wind is shown as an arrow indicated by reference sign W and the resulting direction of movement of the marine vessel (not shown) is indicated by arrow D.

In this embodiment the first section 62 and the second section 63 have been turned into a position where they are anchored to each other by means of one end of each section in order to form an open sail structure for catching the wind W for providing a movement of the marine vessel in direction D. The third section 64 remains at the circumference of the cylindrical shell 61 (broken lines) in order to contribute to the sail structure.

The three sections thus form a sail structure that can be used to forward the marine vessel 1 (FIG. 1) at sea. Clearly, the sections can be positioned differently in order to provide a sail structure. The sail structure can e.g. be turned around and be used to provide thrust in an opposite direction; or alternatively turned only to some degree to provide thrust in any corresponding direction. In this embodiment the two sections that are joined are upstream of the one separately positioned section in view of the wind W; this positioning can e.g. also be reversed.

This provides a means to generate an auxiliary source of thrust for the marine vessel at sea. Clearly, this is an efficient means for saving energy.

Figure 5:
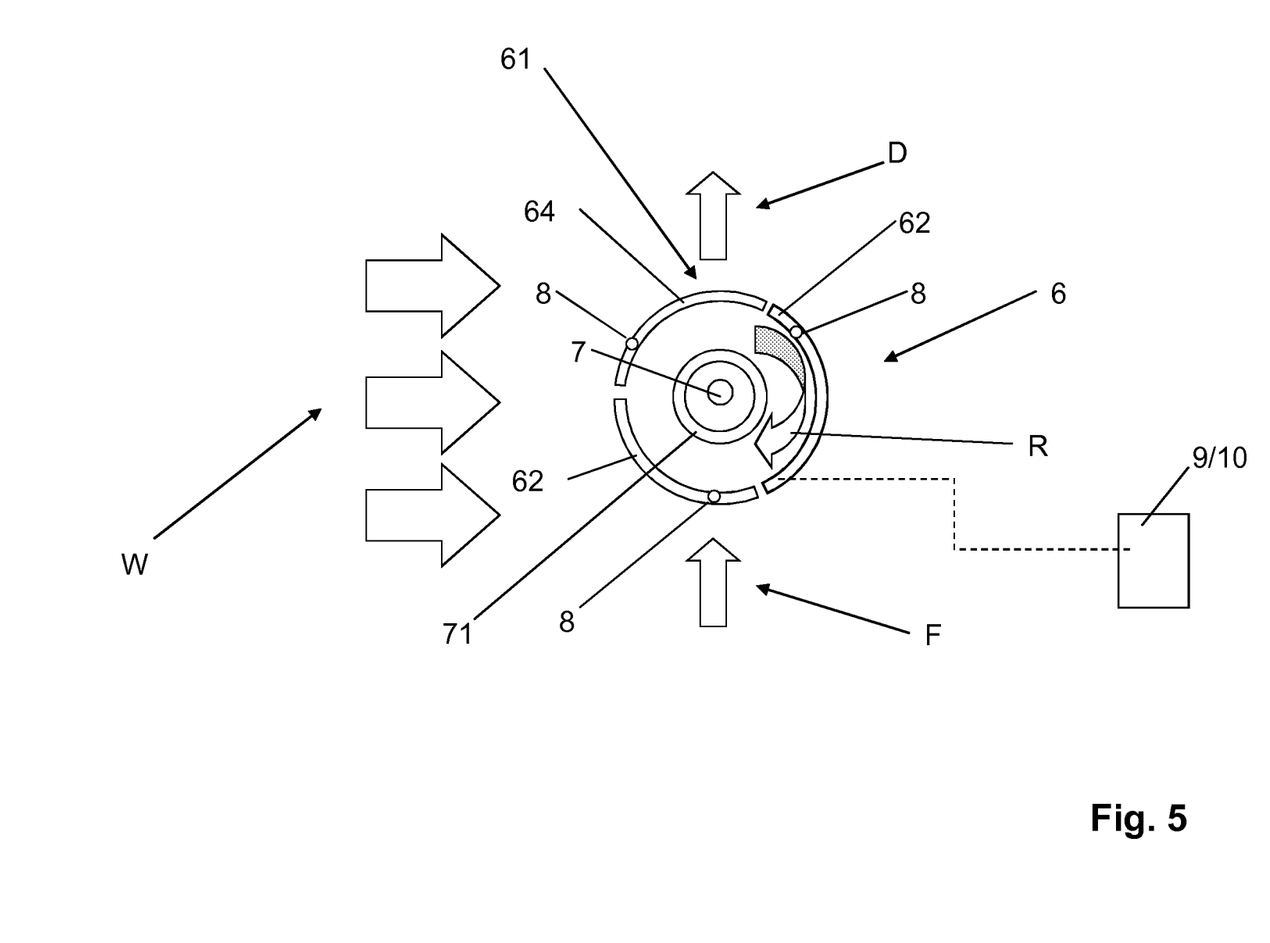
FIG. 5 illustrates a second embodiment of the present invention in a first mode of deployment.

FIG. 5 illustrates a second embodiment of the present invention in a first mode of deployment. The vertically arranged cylinder is indicated by reference sign 6 and the first vertical axis by reference sign 7. The vertically arranged cylinder 6 comprises a cylindrical shell 61 with three sections, a first section 62, a second section 63 and a third section 64. Each section forms a part, more specifically a curved portion, including two opposite ends, of the cylindrical shell 61. Further, each section is provided with a second vertical axis 8 around which the sections are turnable into a given position.

The three parallel arrows show the wind indicated by reference sign W, the curved arrow R indicates the direction of rotation of the vertically arranged cylinder 6 around the first vertical axis 7, reference sign F indicates the force, or forward thrust, generated by the Magnus effect discussed above, and reference sign D indicates the resulting direction of movement of the marine vessel (not shown).

The side wind W engages the vertically arranged cylinder 6, with the three sections (first section 62, second section 63 and third section 64) forming the cylindrical shell 61, which is rotated around the first vertical axis 7 by means of a schematically indicated combined generator and electric motor 10 in direction R, whereby the Magnus effect generates an increased pressure on one side and a decreased pressure, or suction, at the opposite side of the vertically arranged cylinder 6. This results in a force F, or forward thrust, which moves the marine vessel forward in direction D.

In this second embodiment, the vertically arranged cylinder 6 comprises an internal, centrally positioned cylindrical sleeve 71. This internal cylindrical sleeve 71 can provide an additional function. It can advantageously be deployed as a funnel means for an exhaust pipe of the exhaust gas arrangement 4. This will also be discussed below.

The above described function applies to the marine vessel in seagoing operation. The rotation of the vertically arranged cylinder 6 may of course be in an opposite direction, thus in a corresponding manner providing thrust in a corresponding opposite direction.

Figure 6:
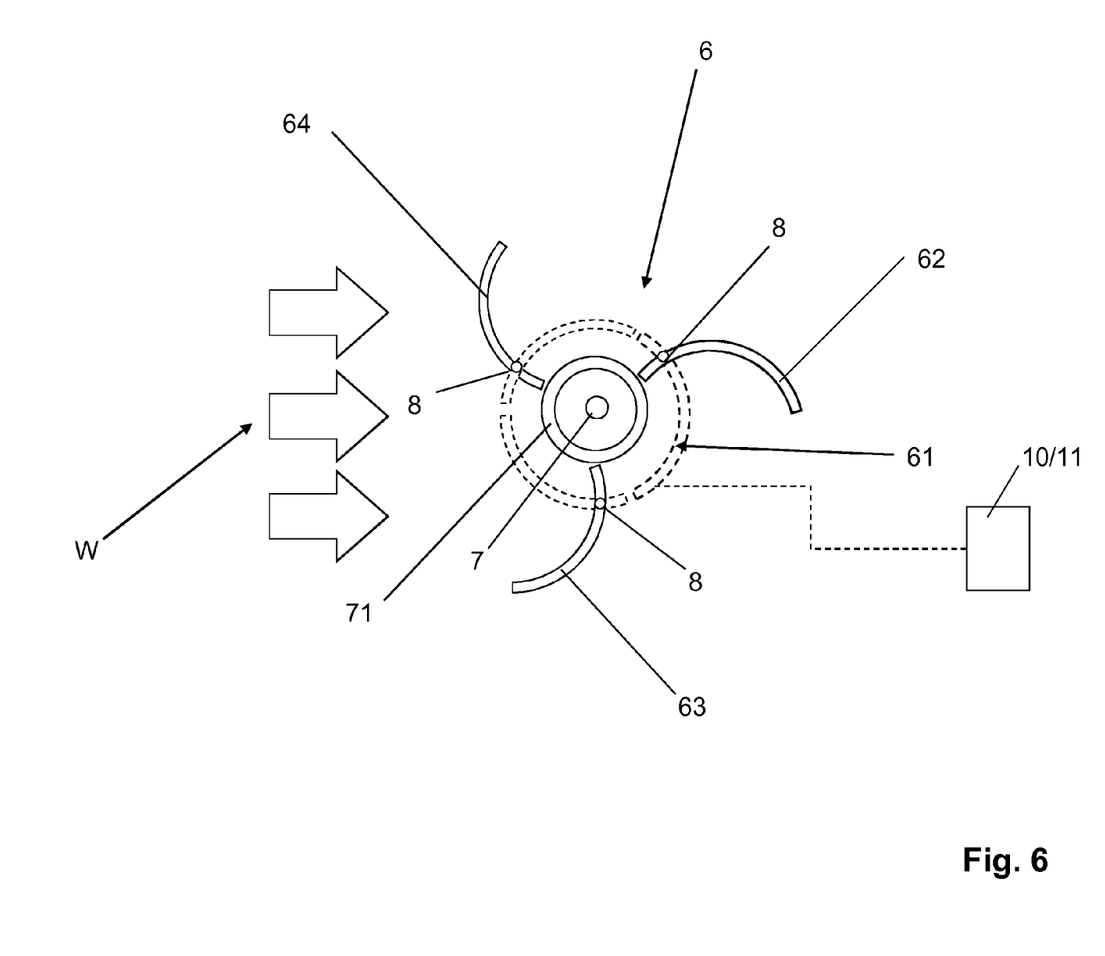
FIG. 6 illustrates the second embodiment in a second mode of deployment.

FIG. 6 illustrates the second embodiment of the present invention in a second mode of deployment. The vertically arranged cylinder is indicated by reference sign 6 and the first vertical axis by reference sign 7. The vertically arranged cylinder 6 comprises three sections, a first section 62, a second section 63 and a third section 64, each arranged to be turned around a second vertical axis 8 positioned offset from the middle of the curved portion of each section. The three parallel arrows show the wind indicated by reference sign W.

In this second embodiment, the vertically arranged cylinder 6 comprises an internal, centrally positioned cylindrical sleeve 71. This internal cylindrical sleeve 71 can provide an additional function. It can advantageously be deployed as a funnel means for an exhaust pipe of the exhaust gas arrangement 4.

Each section, i.e. the first section 62, the second section 63, and the third section 63, provided with a respective second vertical axis 8, is anchored to the internal cylindrical sleeve 71 by means of one of its ends in order to provide a three-scoop wind turbine. The combination of having the second vertical axis 8 offset from the middle of the curved portion and engaging the end of each section with the internal cylindrical sleeve 71, with a given diameter, increases the cross-area or the width of the wind turbine which results in a higher output when rotating.

In this way the three-scoop wind turbine is open to catch the wind W and thus be deployed for rotation. The wind turbine can be used to generate electric power when the marine vessel 1 (FIG. 1) is e.g. in port. The wind turbine is advantageously connected to a combined electric motor and generator 10, which thus can be used both for generating power in this mode of deployment as well as for rotating the vertically arranged cylinder in its first mode of deployment (FIG. 5), in which the three sections form a cylindrical shell 61, now indicated by broken lines.

Clearly a separate electric motor 9 and a separate generator 11 can be used in the first and second modes of deployment respectively of the second embodiment.

This provides electric power production in an environmentally friendly way, particularly in port or other stationary conditions of the marine vessel. Clearly, this is an efficient means for saving energy.

The number of sections composing the cylindrical shell may be more than three, the positions of the second vertical axis can be arranged to adjusted along the curved portion of the sections, and the anchoring of the sections to the first vertical axis or the internal cylindrical sleeve, as well as to each other can be carried out in different ways in order to achieve an optimum efficiency depending on the mode of deployment of the embodiments of the present invention.

The vertically arranged cylinder advantageously has a given vertical height and a given width (diameter). Although it has not been discussed above, the vertically arranged cylinder can be divided into more than one part with respect to its given vertical height. This allows for providing support structures along the height of the vertically arranged cylinder in order to increase its stability. The diameter of the cylinder also affects the width of the wind turbine structure, as well as of the sail structure.

The description is intended to clarify the basic idea of the invention. The invention may vary in detail within the scope of the ensuing claims.

The invention claimed is:

1. A marine vessel, comprising:
   a hull;
   a propulsion arrangement, including:
      an internal combustion engine; and
      a propulsion unit; and
   at least one vertically arranged cylinder including a cylindrical shell and having a first vertical axis,
   wherein said vertically arranged cylinder is rotatable around the first vertical axis,
   wherein the cylindrical shell comprises three sections with a curved portion extending between two opposite ends, each of the three sections comprises a respective second vertical axis around which a respective one of the three sections is turnable, each second vertical axis is positioned at a circumference of the cylindrical shell, and each of the three sections is adjustable into a given rotated position about a respective second vertical axis for positioning the three sections in various configurations suitable for a prevailing operation mode of the marine vessel, and
   wherein two sections of said three sections are adjustable to a rotated position in which vertical edges of the two sections are adjacent to each other to form a sail structure.

2. The marine vessel according to claim 1, wherein the ends of each of the three sections provided with the respective second vertical axis are adjustable against each other to form the cylindrical shell of the vertically arranged cylinder.

3. The marine vessel according to claim 1, wherein each of the three sections provided with the respective second vertical axis is adjustable to a rotated position in which one vertical edge of the section is adjacent to the first vertical axis of the vertically arranged cylinder.

4. The marine vessel according to claim 1, wherein a third section of the three sections is adjustable into a position at the circumference of the cylindrical shell while said vertical edges of a first section and a second section of the three sections are adjacent to each other.

5. The marine vessel according to claim 2, wherein the second vertical axis of each of the three sections is positioned substantially in a middle of the curved portion of each of the three sections.

6. The marine vessel according to claim 1, wherein the vertically arranged cylinder comprises an internal cylindrical sleeve.

7. The marine vessel according to claim 1, wherein each of the three sections provided with the respective second vertical axis is adjustable a rotated position in which one vertical edge of the section is adjacent to the internal cylindrical sleeve.

8. The marine vessel according to claim 7, wherein the respective second vertical axis of each of the three sections is positioned offset from a middle of the curved portion of each of the three sections.

9. The marine vessel according to claim 1, wherein the vertically arranged cylinder is operatively connected to an electric motor, a combined generator and electric motor, and/or a generator.

* * * * *